United States Patent
Jung et al.

(10) Patent No.: US 9,035,942 B2
(45) Date of Patent: May 19, 2015

(54) GRAPHIC IMAGE PROCESSING METHOD AND APPARATUS

(71) Applicant: Samsung Electronics Co., Ltd., Suwon-si (KR)

(72) Inventors: Kil-Soo Jung, Osan-si (KR); Sung-Wook Park, Seoul (KR); Dae-Jong Lee, Suwon-si (KR); Hye-Young Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/928,861

(22) Filed: Jun. 27, 2013

(65) Prior Publication Data

US 2013/0286008 A1   Oct. 31, 2013

Related U.S. Application Data

(63) Continuation of application No. 13/210,434, filed on Aug. 16, 2011, now Pat. No. 8,497,858, which is a continuation of application No. PCT/KR2010/000931, filed on Feb. 16, 2010.

(30) Foreign Application Priority Data

Feb. 17, 2009  (KR) .................. 10-2009-0013152
Feb. 20, 2009  (KR) .................. 10-2009-0014542

(51) Int. Cl.
*G06T 19/00*  (2011.01)
*G06T 15/00*  (2011.01)
*H04N 13/00*  (2006.01)
*H04N 13/02*  (2006.01)

(52) U.S. Cl.
CPC .............. *G06T 15/00* (2013.01); *H04N 13/004* (2013.01); *H04N 13/007* (2013.01); *H04N 13/026* (2013.01)

(58) Field of Classification Search
USPC .......................................... 345/419, 440, 420
See application file for complete search history.

(56) References Cited

U.S. PATENT DOCUMENTS

| | | | |
|---|---|---|---|
| 6,313,866 B1 | 11/2001 | Akamatsu et al. | |
| 7,046,270 B2 | 5/2006 | Murata et al. | |
| 7,054,478 B2 | 5/2006 | Harman | |
| 7,474,308 B2 | 1/2009 | Deering | |

(Continued)

FOREIGN PATENT DOCUMENTS

| CN | 1679056 A | 10/2005 |
|---|---|---|
| CN | 101228799 A | 7/2008 |

(Continued)

OTHER PUBLICATIONS

"Blu-ray Disc Format: 2.B Audio Visual Application Format Specifications for BD-ROM," Blu-ray Disc Association, Mar. 2005, pp. 1-35.

(Continued)

*Primary Examiner* — Kimbinh T Nguyen
(74) *Attorney, Agent, or Firm* — NSIP Law

(57) ABSTRACT

Provided are a method and apparatus for processing a graphic stream. The method may include determining whether a graphic picture is reproducible as a three-dimensional (3D) image by assigning different depth values according to graphic objects or by assigning the same depth value to the graphic picture, using 3D capability information.

4 Claims, 9 Drawing Sheets

(56) References Cited

U.S. PATENT DOCUMENTS

| | | | |
|---|---|---|---|
| 7,689,031 B2 | 3/2010 | Berretty et al. | |
| 7,697,750 B2 | 4/2010 | Simmons | |
| 7,894,633 B1 | 2/2011 | Harman | |
| 8,149,267 B2* | 4/2012 | Sasaki et al. | 348/42 |
| 8,159,529 B2 | 4/2012 | Yoshida et al. | |
| 8,189,033 B2* | 5/2012 | Ikeda et al. | 348/42 |
| 8,497,858 B2 | 7/2013 | Jung et al. | |
| 8,861,940 B2* | 10/2014 | Sasaki et al. | 386/341 |
| 2004/0125447 A1 | 7/2004 | Sato et al. | |
| 2006/0103664 A1* | 5/2006 | Nakanishi | 345/619 |
| 2007/0154167 A1* | 7/2007 | Ando et al. | 386/82 |
| 2007/0247477 A1 | 10/2007 | Lowry et al. | |
| 2008/0198920 A1* | 8/2008 | Yang et al. | 375/240.01 |
| 2008/0278573 A1 | 11/2008 | Ropinski et al. | |
| 2008/0303842 A1 | 12/2008 | Okamoto et al. | |
| 2009/0116732 A1 | 5/2009 | Zhou et al. | |

FOREIGN PATENT DOCUMENTS

| | | |
|---|---|---|
| CN | 101321218 A | 12/2008 |
| EP | 1 548 648 A1 | 6/2005 |
| EP | 1 909 510 A1 | 4/2008 |
| GB | 2 308 284 A | 6/1997 |
| JP | 11-113028 A | 4/1999 |
| JP | 2003-009185 | 1/2003 |
| JP | 2005-229384 A | 8/2005 |
| JP | 2006-191357 A | 7/2006 |
| KR | 10-2004-0022100 A | 3/2004 |
| WO | WO 2008/038205 A2 | 4/2008 |
| WO | WO 2008/044191 | 4/2008 |
| WO | WO 2008/115222 A1 | 9/2008 |

OTHER PUBLICATIONS

European Search Report issued Aug. 2, 2012 in counterpart European Application No. 10743910.1 (10 pages, in English).
European Search Report issued Aug. 6, 2012 in counterpart European Application No. 10743913.5 (10 pages, in English).
Chinese Office Action issued Aug. 8, 2013 in counterpart Chinese Patent Application No. 201080008013.3 (19 pages, in Chinese with English translation).
Chinese Office Action issued Aug. 29, 2013 in counterpart Chinese Patent Application No. 201080008651.5 (12 pages, in Chinese with English translation).
Japanese Office Action issued Dec. 10, 2013 in counterpart Japanese Patent Application No. 2011-550061. (4 pages including partial English translation).
Summons to Oral Proceedings issued Jan. 30, 2014 in counterpart European Patent Application No. 10743910.1 (5 pages in English).
Chinese Office Action issued Mar. 28, 2014 in counterpart Chinese Patent Application No. 201080008651.5.
Indonesian Office Action issued Apr. 30, 2014 in counterpart Indonesian Patent Application No. W-00201103325, (8 pages including English translation).
Decision to Refuse issued Jun. 16, 2014 in counterpart European Patent Application No. 10743910.1. (18 pages in English).
Malaysian Notice of Allowance issued on Aug. 29, 2014 in corresponding Malaysian Application No. MY PI 2011003817 (3 pages, in English).
Japanese Office Action issued on Sep. 30, 2014 in corresponding Japanese Application No. JP 2011-550061 (4 pages, with partial English translation).
European Oral Proceedings issued on Sep. 22, 2014 in corresponding European Application No. EP 10743913.5 (5 pages, in English).
Chinese Office Action issued on Oct. 21, 2014 in corresponding Chinese Application No. 201080008013.3 (9 pages, with English translation).
Japanese Office Action issued Jan. 21, 2014 in counterpart Japanese Patent Application No. 2011-550058. (2 pages including partial English Translation).
Extended European Search Report issued Nov. 21, 2013 in counterpart European Patent Application No. 13161004.0 (5 pages in English).
Korean Office Action issued on Dec. 10, 2014 in counterpart Korean Application No. 10-2009-0014542 (9 pages, with English translation).

* cited by examiner

FIG. 3

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| reserved | | | | | | | |

| b7 | b6 | b5 | b4 | b3 | b2 | b1 | b0 |
|---|---|---|---|---|---|---|---|
| reserved | | | | | | | 3D capability |

FIG. 7
(a) WHEN "CENTER"
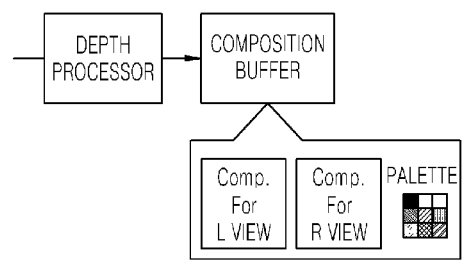
(b) WHEN "LEFT"
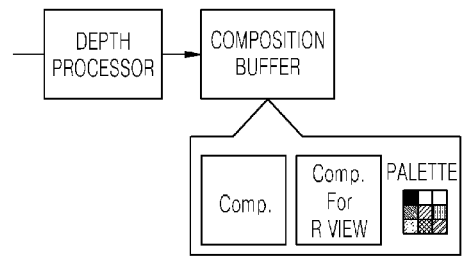
(c) WHEN "RIGHT"
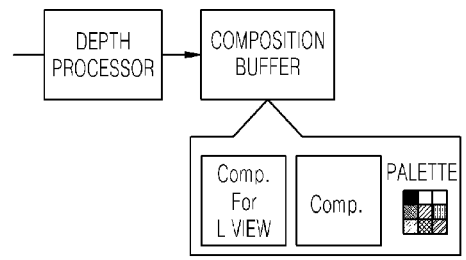

GRAPHIC IMAGE PROCESSING METHOD AND APPARATUS

CROSS REFERENCE TO RELATED APPLICATION(S)

This application is a continuation of U.S. patent application Ser. No. 13/210,434, filed on Aug. 16, 2011, which is a continuation of International Patent Application No. PCT/KR2010/000931, filed on Feb. 16, 2010, which claims the benefit of Korean Patent Application No. 10-2009-0013152, filed on Feb. 17, 2009, and Korean Patent Application No. 10-2009-0014542 filed on Feb. 20, 2009, in the Korean Intellectual Property Office, the entire disclosures of which are incorporated herein by reference for all purposes.

BACKGROUND

1. Field

The following description relates to a method and apparatus for processing a graphic picture, and more particularly, to a method and apparatus for processing a graphic picture to output a graphic picture including a subtitle, a menu, or the like, in a three-dimensional (3D) image.

2. Description of Related Art

Three-dimensional (3D) image technology has become widely available with the development of digital technology. The 3D image technology involves expressing a more realistic image which may be done by assigning information about a depth to a 2D image. The 3D image technology is applicable in various fields, such as communication fields, computer game fields, medical fields, broadcasting fields, and the like. The 3D image technology provides a sense of reality to a user so that he or she seems to be looking at an image in real life.

Because a person's eyes are spaced apart from each other by a distance in a horizontal direction, a 2D image viewed by a left eye and a right eye differs. This difference is referred to as a binocular parallax. The brain combines the different 2D images to generate a 3D image that has a perspective and an apparent presence. Examples of a method of generating a 3D image using binocular parallax include a method of wearing glasses and a method of using an apparatus including a lenticular lens, a parallax barrier, or parallax illumination.

SUMMARY

Various aspects described herein are directed towards a method and apparatus for generating graphic objects by decoding a graphic stream. A first multi-dimensional composition information and color information may be generated by decoding the graphic stream. Second multi-dimensional composition information may be generated from the first multi-dimensional composition information using metadata about the graphic stream. Graphic objects may be output to a screen using the second multi-dimensional composition information and the color information. As described herein, multi-dimensional may correspond to two-dimensional, three-dimensional, or four-dimensional.

In one general aspect, there is provided a method of processing a graphic stream, the method including generating graphic objects by decoding the graphic stream, generating two-dimensional (2D) composition information and color information by decoding the graphic stream, generating three-dimensional (3D) composition information from the 2D composition information using metadata about the graphic stream, and outputting the graphic objects to a screen using the 3D composition information and the color information.

The method may further comprise extracting 3D capability information from a player setting register in a reproducing apparatus, and determining whether a graphic picture is reproducible in 3D by assigning different depth values according to the graphic objects or by assigning a same depth value to the graphic picture, using the 3D capability information, wherein the generating of the 3D composition information comprises, in response to determining that the graphic picture is reproducible in 3D by assigning the different depths values according to the graphic objects using the 3D capability information, obtaining a location movement value according to the graphic objects using the metadata, converting an object location value included in the 2D composition information to a value that is spaced apart from the object location value to the left and/or the right by a predetermined distance, using the location movement value, and generating left eye composition information for generating a left eye graphic picture and right eye composition information for generating a right eye graphic picture, each comprising the converted object location value.

The obtaining of the location movement value may comprise extracting an object depth value to be applied to each of the graphic objects from the metadata, and obtaining a location movement value of each of the graphic objects using the object depth value.

The generating of the 3D composition information may comprise generating the 3D composition information by adding hole compensation information that is included in the metadata to each of the left eye composition information and the right eye composition information.

The hole compensation information may comprise hole region identification information and color reference information.

The outputting of the graphic objects may comprise generating each of the left eye graphic picture and the right eye graphic picture by arranging each of the graphic objects in a changed location and applying a color indicated by the color reference information to a hole region, using the 3D composition information.

The hole compensation information may comprise at least one of hole region identification information and a hole graphic object to be inserted into a hole region.

The outputting of the graphic objects may comprise generating each of the left eye graphic picture and the right eye graphic picture by arranging each of the graphic objects in a changed location and arranging the hole graphic object in the hole region, using the 3D composition information.

The generating of the 3D composition information may comprise extracting, from the metadata, graphic picture generating standard information that indicates which video image from among a left eye video image, a right eye video image, and a 2D video image, is used to prepare the graphic stream.

In response to the graphic stream being prepared based on the left eye video image, the generating of the 3D composition information may comprise obtaining a location movement value of each of the graphic objects using the metadata, changing an object location value included in the 2D composition information to the left and/or right by a predetermined distance, using the location movement value, and generating right eye composition information for generating a right eye graphic picture including the changed location movement value.

In response to the graphic stream being prepared based on the right eye video image, the generating of the 3D composition information may comprise obtaining a location movement value of each of the graphic objects using the metadata, changing an object location value included in the 2D composition information to the left and/or right by a predetermined distance, using the location movement value, and generating left eye composition information for generating a left eye graphic picture including the changed object location value.

The method may further comprise extracting 3D capability information from a player setting register in a reproducing apparatus for performing the method, and determining whether a graphic picture is reproducible in 3D by assigning different depth values according to the graphic objects or by assigning the same depth value to the graphic picture, using the 3D capability information, wherein the generating of the 3D composition information comprises, in response to determining that the graphic picture is reproducible in 3D by assigning the same depth value to the graphic picture using the 3D capability information, obtaining a location movement value of a graphic picture to output all graphic objects using the metadata, changing an object location value included in the 2D composition information to the left and/or right by a predetermined distance using the location movement value of the graphic picture, and generating the 3D composition information including the changed object location value.

The outputting of the graphic objects may comprise outputting the graphic picture alternately at changed locations of the left and/or right using the 3D composition information.

In another aspect, there is provided an apparatus for processing a graphic stream, the apparatus including a graphic processor configured to generate graphic objects, two-dimensional (2D) composition information, and color information by decoding a graphic stream, a depth processor configured to generate three-dimensional (3D) composition information from the 2D composition information using metadata about the graphic stream, and a graphic picture output unit configured to output the graphic objects to a screen using the 3D composition information and the color information.

The apparatus may further comprise a player setting register for storing 3D capability information, wherein the depth processor is further configured to determine whether a graphic picture is reproducible in 3D by assigning different depth values according to the graphic objects or by assigning the same depth value to the graphic picture, using the 3D capability information, and in response to determining that the graphic picture is reproducible in 3D by assigning the different depth values according to the graphic objects by using the 3D capability information, the depth processor is further configured to obtain a location movement value according to each of the graphic objects using the metadata, to change an object location value included in the 2D composition information to a value that is spaced apart from the object location value to the left and/or right by a predetermined distance using the location movement value, and to generate left eye composition information for generating a left eye graphic picture and right eye composition information for generating a right eye graphic picture, each comprising the changed object location value.

The depth processor may be further configured to extract an object depth value to be applied to each of the graphic objects from the metadata, and to obtain a location movement value of each of the graphic objects using the object depth value.

The depth processor may be configured to generate the 3D composition information by adding hole compensation information included in the metadata to each of the left eye composition information and the right eye composition information.

The hole compensation information may comprise hole region identification information and color reference information.

The graphic picture output unit may be further configured to generate each of the left eye graphic picture and the right eye graphic picture by arranging each of the graphic objects in a changed location and applying a color indicated by the color reference information to a hole region.

The hole compensation information may comprise at least one of hole region identification information and a hole graphic object to be inserted into a hole region.

The graphic picture output unit may be configured to generate each of the left eye graphic picture and the right eye graphic picture by arranging each of the graphic objects in a changed location and arranging the hole graphic object in the hole region.

The depth processor may be further configured to extract, from the metadata, graphic picture generating standard information indicating which video image from among a left eye video image, a right eye video image, and a 2D video image, is used to prepare the graphic stream.

In response to the graphic stream being prepared based on the left eye video image, the depth processor may be further configured to obtain a location movement value of each of the graphic objects using the metadata, to change an object location value included in the 2D composition information to the left and/or right by a predetermined distance using the location movement value, and to generate right eye composition information for generating a right eye graphic picture including the changed object location value.

In response to the graphic stream being prepared based on the right eye video image, the depth processor may be further configured to obtain a location movement value of each of the graphic object using the metadata, to change an object location value included in the 2D composition information to the left and/or right by a predetermined distance using the location movement value, and to generate left eye composition information for generating a left eye graphic picture including the changed object location value.

The apparatus may further comprise a player setting register configured to store 3D capability information, wherein the depth processor is further configured to determine whether a graphic picture is reproducible in 3D by assigning different depth values according to the graphic objects or by assigning the same depth value to the graphic picture using the 3D capability information, and in response to determining that the graphic picture is reproducible in 3D by assigning the same depth value to the graphic picture using the 3D capability information, the depth processor is further configured to obtain a location movement value of the graphic picture to output entire graphic objects using the metadata, to change an object location value included in the 2D composition information to the left and/or right by a predetermined distance using the location movement value of the graphic picture, and to generate the 3D composition value including the changed object location value.

The graphic picture output unit may be further configured to output the graphic picture alternately at changed locations to the left and/or right using the 3D composition information.

In another aspect, there is provided a computer-readable storage medium including a graphic stream, and metadata about the graphic stream, wherein the graphic stream comprises a graphic object, two-dimensional (2D) composition information, and color information, and the metadata comprises hole compensation information and one of graphic object identification information, a depth value of the graphic object, and a location movement value, and the metadata is used to generate three-dimensional (3D) composition information for outputting the graphic object in 3D from the 2D composition information.

In another aspect, there is provided a computer-readable storage medium having stored therein program instructions to cause a processor to implement a method of processing a graphic stream, the method including generating graphic objects by decoding a graphic stream, generating two-dimensional (2D) composition information and color information by decoding the graphic stream, generating three-dimensional (3D) composition information from the 2D composition information using metadata about the graphic stream, and outputting the graphic objects to a screen using the 3D composition information and the color information.

In another aspect, there is provided a computer-readable storage medium having stored therein program instructions to cause a processor to implement a method of processing a graphic stream, the method including determining whether a graphic picture is reproducible in three dimensions (3D) by assigning different depth values according to graphic objects or by assigning a same depth value to the graphic picture, using 3D capability information.

In another aspect, there is provided a computer-readable storage medium including a graphic stream, and metadata about the graphic stream for reproducing the graphic stream in a three-dimensional (3D) graphic picture, wherein the metadata comprises depth information about a graphic object and depth information about a graphic picture, and the depth information about the graphic object comprises hole compensation information and one of a graphic object identifier, a depth value of the graphic object, and a location movement value.

In another aspect, there is provided a method of processing a graphic stream, the method including determining whether a graphic picture is reproducible in three dimensions (3D) by assigning different depth values according to graphic objects, or by assigning the same depth value to the graphic picture, using 3D capability information.

The method may further comprise, prior to the determining, determining whether a graphic stream to be decoded is a stereoscopic graphic stream, wherein the determining of whether the graphic picture is reproducible in 3D is performed when the graphic stream to be decoded is a stereoscopic graphic stream.

The 3D capability information may be stored in a player setting register in a reproducing apparatus, and the method may further comprise extracting the 3D capability information from the player setting register before the determining.

The method may further comprise, in response to determining that the graphic picture is reproducible in 3D by assigning the different depth values according to graphic objects using the 3D capability information, extracting depth information about the graphic objects from metadata about a graphic stream, and reproducing a graphic stream in 3D using the depth information about the graphic objects.

The depth information about the graphic objects may comprise a graphic object identifier and one of a depth value to be applied to each of the graphic objects identified by the graphic object identifier and a location movement value, and the reproducing of the graphic stream in 3D using the depth information about the graphic objects may comprise obtaining a location to map each of the graphic objects by moving each of the graphic objects to the left and/or right using the location movement value, and generating a left eye graphic picture and a right eye graphic picture by arranging each of the graphic objects in the obtained location.

The method may further comprise, in response to the depth information about the graphic objects comprising a depth value to be applied to each of the graphic objects, changing the depth value to the location movement value.

The depth information about the graphic objects may further comprise hole compensation information, and the generating of the left eye graphic picture and the right eye graphic picture may comprise filling a hole region generated by changing a location of each of the graphic objects, using the hole compensation information.

The method may further comprise, in response to determining that the graphic picture is reproducible in 3D by assigning the same depth value to the graphic picture using the 3D capability information, extracting depth information about the graphic picture from metadata about a graphic stream, and reproducing the graphic stream in 3D using the depth information about the graphic picture.

The reproducing of the graphic stream in 3D may comprise obtaining a location movement value to move the graphic picture using the depth information about the graphic picture, and obtaining a location to map the graphic picture by moving the graphic picture to the left and/or right using the location movement value, and generating a left eye graphic picture and a right eye graphic picture by arranging the graphic picture in the obtained location.

In another aspect, there is provided an apparatus for processing a graphic stream including a graphic decoder configured to determine whether a graphic picture is reproducible in three-dimensions (3D) by assigning different depth values according to graphic objects, or assigning the same depth value to the graphic picture, using 3D capability information.

The graphic decoder may be further configured to determine whether a graphic stream to be decoded is a stereoscopic graphic stream, and if the graphic stream to be decoded is a stereoscopic graphic stream, the graphic decoder may be configured to determine whether the graphic picture is reproducible in 3D by assigning different depth values according to the graphic objects or assigning the same depth value to the graphic picture, using the 3D capability information.

The apparatus may further comprise a player setting register configured to store the 3D capability information, wherein the graphic decoder extracts the 3D capability information from the player setting register.

In response to determining that the graphic picture is reproducible in 3D by assigning the different depth values according to graphic objects using the 3D capability information, the graphic decoder may be further configured to extract depth information about the graphic objects from metadata about a graphic stream, and to reproduce a graphic stream in 3D using the depth information about the graphic objects.

The depth information about the graphic objects may comprise a graphic object identifier and one of a depth value to be applied to each of the graphic objects identified by the graphic object identifier and a location movement value, and the graphic decoder may be further configured to obtain a location to map each of the graphic objects by moving each of the graphic objects to the left and/or right using the location movement value, and to generate a left eye graphic picture and a right eye graphic picture by arranging each of the graphic objects in the obtained location.

In response to the depth information about the graphic objects comprising a depth value to be applied to each of the graphic objects, the graphic decoder may be further configured to change the depth value to the location movement value.

The depth information about the graphic objects may further comprise hole compensation information, and the graphic decoder may be further configured to fill a hole region generated by changing a location of each of the graphic objects, using the hole compensation information.

In response to determining that the graphic picture is reproducible in 3D by assigning the same depth value to the graphic picture using the 3D capability information, the graphic decoder may be further configured to extract depth information about the graphic picture from metadata about a graphic stream, and to reproduce the graphic stream in 3D using the depth information about the graphic picture.

The graphic decoder may be further configured to obtain a location movement value to move the graphic picture using the depth information about the graphic picture, to obtain a location to map the graphic picture by moving the graphic picture to the left and/or right using the location movement value, and to generate a left eye graphic picture and a right eye graphic picture by arranging the graphic picture in the obtained location.

Other features and aspects may be apparent from the following detailed description, the drawings, and the claims.

BRIEF DESCRIPTION OF THE DRAWINGS

FIG. 3 is a diagram illustrating an example of a player setting register including a memory of the reproducing apparatus of FIG. 2.

FIGS. 7A through 7C are diagrams illustrating examples of composition information that is generated when graphic picture generating standard information included in metadata is used.

Figure 1:
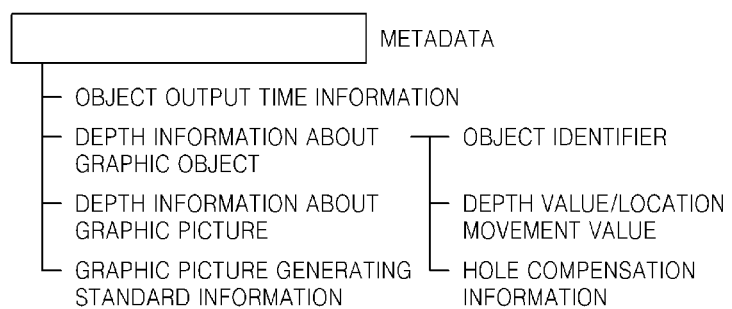
FIG. 1 is a diagram illustrating an example of metadata of a graphic stream.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various examples herein are directed towards a method and apparatus for processing a graphic picture, which output a graphic picture, such as a subtitle or a menu, in a 3-dimensional (3D) image.

FIG. 1 illustrates an example of metadata of a graphic stream.

Referring to FIG. 1, the metadata includes information about a graphic stream. In order to give a three-dimensional (3D) effect to a two-dimensional (2D) image, a depth is given to the 2D image. When a person views a screen, an image projected on the screen forms on the back of two eyes, and a distance between two points of the images formed on the back of the eyes is referred to as parallax. The parallax is classified into positive parallax, zero parallax, and negative parallax. Positive parallax denotes parallax when an image is formed inside the screen, wherein the parallax is smaller than or equal to a distance between the eyes. As a value of parallax increases, a 3D effect of the image that appears to be located deeper than the screen is obtained.

When an image is formed in 2D on a screen, the parallax is 0. When the parallax is 0, a user is unable to feel a 3D effect. The negative parallax denotes a parallax when an image protrudes from a screen, and is generated when visual lines are crossed such that a user feels a 3D effect of an object appearing to protrude from the screen.

A video stream may be reproduced with a graphic stream. For example, the graphic stream may include at least one of a presentation graphic stream for providing a subtitle, an interactive graphic stream for providing a menu that includes buttons, or the like, to interact with a user, and a graphical overlay displayed by a program element, such as JAVA®. When the video stream is reproduced in a 3D image, the graphic stream that is reproduced with the video stream may also be reproduced in 3D. According to various examples herein, data including information for reproducing a graphic stream in 3D is described as a stream that is different from the graphic stream. For example, the data may be metadata about the graphic stream.

For example, the metadata about the graphic stream may include object output time information indicating a time to output graphic objects included in the graphic stream, and depth information about the graphic objects. A graphic object may indicate a button or a subtitle that is included in a graphic picture displayed by the graphic stream. For example, the object output time information indicates a time that it takes to output a menu or a subtitle, i.e., a graphic object. The object output time information may be indicated in a presentation time stamp (PTS) value of an interactive composition segment (ICS), a presentation composition segment (PCS), or a dialogue presentation segment (DPS). The graphic picture displayed by the graphic stream may include one or more graphic objects indicating a menu, a button, a subtitle, and the like.

If a plurality of graphic objects are included in the graphic picture displayed by the graphic stream, different depth values may be assigned to the graphic objects, or the same depth value may be assigned to the graphic picture including the graphic objects. In various examples herein, information for assigning different depth values to the graphic objects included in the graphic picture is referred to as depth information about the graphic objects, and information for assigning the same depth value to the graphic picture including the graphic objects is referred to as depth information about the graphic picture.

The metadata about the graphic stream may include at least one of the depth information about the graphic objects and the depth information about the graphic picture.

The depth information about the graphic objects may include an object identifier that indentifies a graphic object, a depth value or location movement value to be applied to a graphic object, and hole compensation information. The object identifier is information that may be used to identify a certain graphic object from among graphic objects generated by decoding the graphic stream.

The depth value or location movement value is a depth value that may be assigned to a graphic object identified by the object identifier or a value for moving a location of a graphic object in a screen based on the depth value.

The hole compensation information is information for compensating for a hole that is generated at an original object location. The hole may be created when the location of the graphic object is changed by the location movement value to give the graphic object a 3D effect. For example, the hole compensation information may include hole region identification information for identifying a hole region and color reference information indicating a type of color to fill the identified hole region. As another example, the hole compensation information may include information about an image, or the like, that is to be inserted into the hole region, instead of the color reference information. In order to indicate the image, or the like, that is to be inserted into the hole region, the hole compensation information may include hole composition information for indicating a hole object that is to be inserted into the hole region and a location or output time of the hole object.

The metadata about the graphic stream may include graphic picture generating standard information. In order to reproduce a 2D image as a 3D image, a left eye image and a right eye image, which respectively lean toward the left and right by a distance according to the depth value, are generated from the 2D image. In this example, the left eye image and the right eye image may be alternately output on a screen. There is no problem when the graphic stream is generated for a 2D image, but when the graphic stream is generated for a left eye image or a right eye image, an image processing apparatus (not shown) may generate only a right eye image by using a graphic stream generated for a left eye image, or may generate only a left eye image by using a graphic stream generated for a right eye image. Accordingly, the metadata may notify the image processing apparatus whether a graphic stream is generated for a 2D image, a left eye image, or a right eye image. Accordingly, the metadata may include the graphic picture generating standard information that includes information indicating whether the graphic stream is for generating a left eye graphic picture, a right eye graphic picture, or a plane graphic picture.

Figure 2:
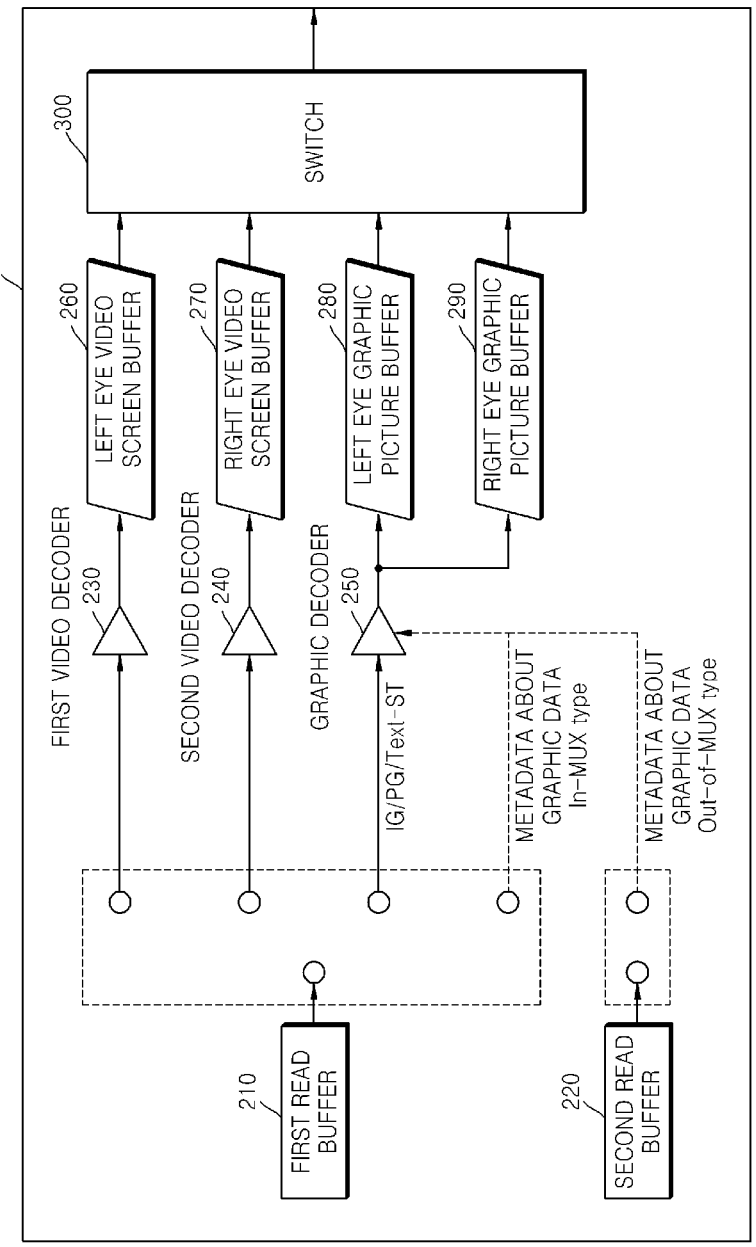
FIG. 2 is a diagram illustrating an example of a reproducing apparatus.

FIG. 2 illustrates an example of a reproducing apparatus. For example, the reproducing apparatus may be, or may be included in a terminal such as a television, a camera, a computer, a phone, a tablet, a home appliance, a sensor, and the like.

Referring to FIG. 2, reproducing apparatus 200 includes a first read buffer 210, a second read buffer 220, a first video decoder 230, a second video decoder 240, a graphic decoder 250, a left eye video screen buffer 260, a right eye video screen buffer 270, a left eye graphic picture buffer 280, a right eye graphic picture buffer 290, and a switch 300.

The first read buffer 210 may read a video stream and a graphic stream from a medium, such as a disk, that is inserted into the reproducing apparatus 200. For example, the graphic stream may include at least one of a presentation graphic stream, an interactive graphic stream, and a graphical overlay. If metadata about the graphic stream is multiplexed with the video stream and the graphic stream, the first read buffer 210 may also read and store the metadata about the graphic stream from the medium. As another example, if the metadata about the graphic stream is not multiplexed with the video stream and the graphic stream, but is instead stored in the medium as an individual stream, the second read buffer 220 may read the metadata from the medium and pre-load the metadata in a storage memory of the reproducing apparatus 200.

The first video decoder 230 and the second video decoder 240 may each decode a stereoscopic video stream. For example, the first video decoder 230 may decode a left eye video stream and the second video decoder 240 may decode a right eye video stream. The left eye video screen buffer 260 may store a left eye video screen that is generated by decoding the left eye video stream, and the right eye video screen buffer 270 may store a right eye video screen that is generated by decoding the right eye video stream.

The graphic decoder 250 may decode the graphic stream by interpreting the metadata. For example, the graphic decoder 250 may extract depth information about graphic objects, depth information about a graphic picture from the metadata, and the like. Whether the graphic decoder 250 is to extract the depth information about the graphic objects or the depth information about the graphic picture from the metadata may be based on how the reproducing apparatus 200 reproduces the graphic stream in 3D.

Although not shown in FIG. 2, the reproducing apparatus 200 may include a memory, such as a register. The memory may store information that indicates whether the reproducing apparatus 200 is capable of reproducing the graphic stream in 3D. As another example, the memory may store a flag indicating how the reproducing apparatus 200 reproduces the graphic stream in 3D. Hereinafter, in various examples the flag is referred to as 3D capability information.

The 3D capability information may include a flag that indicates whether the reproducing apparatus 200 reproduces the graphic stream in 3D by assigning different depth values according to graphic objects or by assigning the same depth value to the graphic picture.

If the reproducing apparatus 200 does not have a function to reproduce the graphic stream in 3D, the graphic decoder 250 may reproduce the graphic stream in 2D. In this example, the graphic decoder 250 reproduces the graphic picture in 2D by generating the same graphic picture on the left eye graphic picture buffer 280 and the right eye graphic picture buffer 290, or by generating a graphic picture only on one of the left eye graphic picture buffer 280 and the right eye graphic picture buffer 290.

If the reproducing apparatus 200 is capable of reproducing the graphic stream in 3D, the reproducing apparatus 200 may determine whether the medium, such as a disk, includes both the left eye graphic stream and the right eye graphic stream. For example, if the disk includes only one graphic stream, without the graphic stream being divided into a left eye graphic stream and a right eye graphic stream, the graphic decoder 250 may extract the depth information about the graphic picture from the metadata, and may generate the graphic picture that has a depth of the extracted depth information using the extracted depth information and the graphic stream. In this example, the graphic decoder 250 may obtain a location movement value corresponding to a depth value to be applied to the entire graphic picture using the depth information about the graphic picture, and may draw the left eye graphic picture and the right eye graphic picture, which are obtained by mapping the graphic picture in locations moved to the left and/or right according to the location movement value, on the left eye graphic picture buffer 280 and the right eye graphic picture buffer 290, respectively. The graphic picture generated should have the same depth value throughout.

If the reproducing apparatus 200 is capable of reproducing the graphic stream in 3D and both the left eye graphic stream and the right eye graphic stream are included in the medium, i.e., when the medium includes the stereoscopic graphic stream, the graphic decoder 250 may determine how the reproducing apparatus 200 reproduces the graphic stream in 3D by extracting the 3D capability information from the memory. In this example, the graphic decoder 250 may determine whether the reproducing apparatus 200 is capable of reproducing the graphic stream in 3D by assigning different depth values according to the graphic objects included in the graphic picture or by assigning the same depth value to the graphic picture, using the flag included in the 3D capability information.

If the 3D capability information includes a flag indicating that the reproducing apparatus 200 is capable of reproducing the graphic stream in 3D by applying the different depth values according to the graphic objects, the graphic decoder 250 may extract the depth information about the graphic objects from the metadata, decode the left eye graphic stream and the right eye graphic stream using the extracted depth information, and generate the left eye graphic picture and the right eye graphic picture such that have different depth values that are applied according to the graphic objects. In this example, the graphic decoder 250 may extract the object identifier, the depth value to be applied to each identified graphic object, and/or the location movement value from the depth information about the graphic objects, and may generate the left eye graphic picture and the right eye graphic picture by mapping each graphic object at locations moved left and right according to the location movement value, on the left eye graphic picture buffer 280 and the right eye graphic picture buffer 290, respectively.

If the 3D capability information includes a flag indicating that the reproducing apparatus 200 is capable of reproducing the graphic stream in 3D by assigning the same depth value to the graphic picture, the graphic decoder 250 may extract the depth information about the graphic picture from the metadata, obtain the location movement value for assigning the same depth value to the graphic picture using the extracted depth information, and generate the left eye graphic picture and the right eye graphic picture by mapping the graphic picture at locations moved left and right according to the location movement value, on the left eye graphic picture buffer 280 and the right eye graphic picture buffer 290, respectively.

The switch 300 may alternately and continuously output the left eye video screen and the right eye video screen stored in the left eye video screen buffer 260 and the right eye video screen buffer 270. As another example, the switch 300 may alternately and sequentially output the left eye graphic picture and the right eye graphic picture stored in the left eye graphic picture buffer 280 and the right eye graphic picture buffer 290.

In FIG. 2, the reproducing apparatus 200 includes two graphic picture buffers, i.e., the left eye graphic picture buffer 280 and the right eye graphic picture buffer 290. As another example, the reproducing apparatus 200 may include only one graphic picture buffer. For example, if the reproducing apparatus 200 does not have a function to reproduce the graphic stream in 3D, the reproducing apparatus 200 may only include one graphic picture buffer. In this example, the graphic decoder 250 may draw a graphic picture on the graphic picture buffer to reproduce the graphic picture in 2D.

As another example, the reproducing apparatus 200 may include only one graphic picture buffer even if the reproducing apparatus 200 has a function to reproduce the graphic stream in 3D. If only one graphic picture buffer is included, the reproducing apparatus 200 may reproduce the graphic picture in 3D by assigning the same depth value to the graphic picture. In this example, the graphic decoder 250 may obtain the location movement value for moving the graphic picture to the left and right using the depth information about the graphic picture, and alternately generate the graphic picture at locations moved to the left and right of the graphic picture buffer according to the location movement value. Here, the graphic picture reproduced by the reproducing apparatus 200 is assigned with the same depth value.

As such, a reproducing apparatus may determine whether to reproduce a graphic stream in 3D by applying the same depth value to a graphic picture or by applying different depth values according to a plurality of graphic objects that are included in the graphic picture, using 3D capability information that is stored in a player setting register of the reproducing apparatus.

FIG. 3 illustrates an example of a player setting register constituting a memory of the reproducing apparatus 200 of FIG. 2.

For example, the memory of the reproducing apparatus 200 may include a player setting register and a playback status register. The playback status register may be a register in which a stored value changes based on a reproduction status of the reproducing apparatus 200. The player setting register may be a register in which content is not changed via a navigation command or an application programming interface (API) command in a disk, and may store values set when the reproducing apparatus 200 is released.

The player setting register may store information indicating whether the reproducing apparatus 200 is capable of reproducing the graphic stream in 3D. Also, the player setting register may store 3D capability information indicating how the reproducing apparatus 200 reproduces the graphic stream in 3D.

Referring to FIG. 3, for example, 2 bits from among 32 bits of the player setting register, for example b0 and b1, may store the 3D capability information. The 3D capability information may include a flag indicating how the graphic stream is reproduced in 3D. The 3D capability information may include a flag indicating how each graphic stream is reproduced in 3D according to graphic streams, i.e., according to each of an interactive graphic stream and a presentation graphic stream.

The 3D capability information may include a flag indicating that the reproducing apparatus 200 is capable of reproducing the graphic stream in 3D by assigning different depth values according to graphic objects included in the graphic picture. The 3D capability information may include a flag indicating that the reproducing apparatus 200 is capable of reproducing the graphic stream in 3D by assigning the same depth value to the graphic picture.

If the 3D capability information includes the flag indicating that the reproducing apparatus 200 is capable of reproducing the graphic stream in 3D by assigning the same depth value to the graphic picture, the reproducing apparatus 200 may extract the depth information about the graphic picture from the metadata and reproduce the graphic picture using the extracted depth information.

If the 3D capability information includes the flag indicating that the reproducing apparatus 200 is capable of reproducing the graphic stream in 3D by assigning the different depth values according to the graphic objects, the graphic decoder 250 may extract the depth information about the graphic objects from the metadata and reproduce the graphic picture in 3D using the extracted depth information. The graphic decoder 250 may identify each graphic object included in the graphic stream using the object identifier included in the depth information about the graphic objects, and may obtain a location to map each graphic object on the left eye graphic picture and the right eye graphic picture using the depth value or location movement value assigned to the each identified graphic object. The depth value or location movement value may differ based on the graphic objects. The graphic decoder 250 may generate the left eye graphic picture and the right eye graphic picture by differentiating the locations to move the graphic objects, and alternately output the left eye graphic picture and the right eye graphic picture. In this example, the graphic picture reproduced by the reproducing apparatus 200 may be assigned with different depth values based on the graphic objects included in the graphic picture.

As such, a player setting register of a reproducing apparatus may include at least one of information indicating whether the reproducing apparatus supports reproducing a graphic stream in 3D, and 3D capability information including a flag indicating how the graphic stream is reproduced in 3D.

Figure 4:
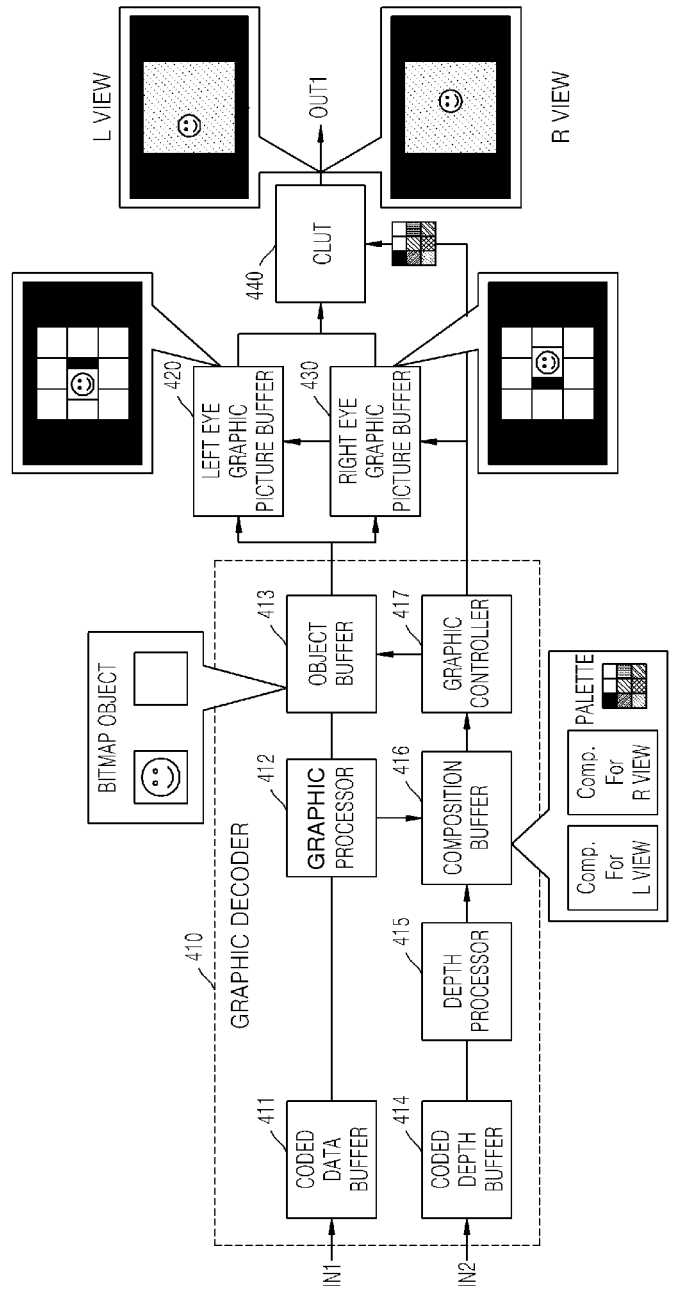
FIG. 4 is a diagram illustrating an example of an apparatus for processing a graphic stream.

FIG. 4 illustrates an example of an apparatus for processing a graphic stream.

Referring to FIG. 4, the apparatus includes a graphic decoder 410, a left eye graphic picture buffer 420, a right eye graphic picture buffer 430, and a color look-up table (CLUT) 440. The graphic decoder 410 includes a coded data buffer 411, a graphic processor 412, an object buffer 413, a coded depth buffer 414, a depth processor 415, a composition buffer 416, and a graphic controller 417.

For example, a graphic stream to be decoded may be recorded in the coded data buffer 411. The graphic processor 412 may decode the graphic stream that is recorded in the coded data buffer 411 to generate at least one graphic object, 2D composition information, and color information.

The graphic processor 412 may transmit a graphic object for an image, such as a button or a subtitle, to the object buffer 413. In the example of FIG. 4, the object buffer 413 stores two graphic objects, i.e., a smiley face figure and a square.

The graphic processor 412 may transmit the 2D composition information and the color information to the composition buffer 416. For example, the 2D composition information may be information used while arranging a graphic object on a screen in 2D, and may be used to control a screen output of the graphic object.

Metadata about a graphic stream may be included in the coded depth buffer 414.

In some examples, a player setting register may be included in the apparatus of FIG. 4, and the player setting register may store 3D capability information indicating how the apparatus reproduces a graphic stream in 3D. The apparatus may determine whether a graphic stream is reproducible in 3D by assigning the same depth value throughout a graphic picture or by assigning different depth values based on a plurality of graphic objects that are included in the graphic picture, using the 3D capability information.

If the apparatus determines that the graphic stream is reproducible in 3D by applying the different depth values according to the graphic objects using the 3D capability information, the apparatus may reproduce the graphic stream in 3D by extracting object output time information and depth information about the graphic objects from metadata.

The depth processor 415 may extract and interpret depth information about the graphic stream from the metadata that is stored in the coded depth buffer 414. For example, the depth information about the graphic objects may include an object identifier and a depth value or location movement value to be assigned to a graphic object identified by the object identifier. The depth processor 415 may identify a graphic object included in the graphic stream using the object identifier that is included in the depth information about the graphic objects.

The depth processor 415 may change a location value of the identified graphic object that is included in 2D composition information to the left or right by a predetermined distance, using the location movement value that is included in the depth information. If the depth value is included instead of the location movement value in the metadata, the depth processor 415 may obtain a location to map a graphic object in the left and right eye graphic pictures using the depth value, and may obtain the location movement value of the graphic object using a difference between the location to map the graphic object and an original location of the graphic object.

The depth processor 415 may generate left eye composition information in which a location value of the graphic object is changed to the left or right by the predetermined distance from the original location. Also, the depth processor 415 may generate right eye composition information in which the location value of the graphic object is changed to the left or right by the predetermined distance from the original location. In various examples, the left eye composition information and the right eye composition information may be used to arrange a left eye graphic picture and a right eye graphic picture on a screen.

The depth processor 415 may extract and interpret hole compensation information from the metadata to fill a hole region that is generated as the location of the graphic object changes. In FIG. 4, it is assumed that the hole compensation information includes hole region identification information for identifying the hole region and color reference information indicating a color that is to be used to fill the hole region. The depth processor 415 may generate 3D composition information by inserting the hole compensation information into each of the left eye composition information and the right eye composition information. The 3D composition information may be used for arranging a graphic object in 3D on a screen in which the location value of the graphic object in the 2D composition information is changed, and includes the hole compensation information. The depth processor 415 stores the generated 3D composition information in the composition buffer 416.

The graphic controller 417 may detect a presentation time stamp (PTS) time to output the graphic object using the object output time information included in the metadata. If the PTS indicates it is time to output the graphic object, the graphic controller 417 may read the graphic object stored in the object buffer 413 using the 3D composition information stored in the composition buffer 416, and may transmit and arrange an image to be output on the screen to the left eye graphic picture buffer 420 and the right eye graphic picture buffer 430.

The graphic controller 417 may form the graphic object on the screen by transmitting the color information to the CLUT 440. Here, the graphic controller 417 may fill the hole region with a color referred to by the color reference information, using the hole compensation information.

As such, 3D composition information may be generated using 2D composition information about a graphic object, and the graphic object may be output on a screen in 3D using the 3D composition information.

Figure 5:
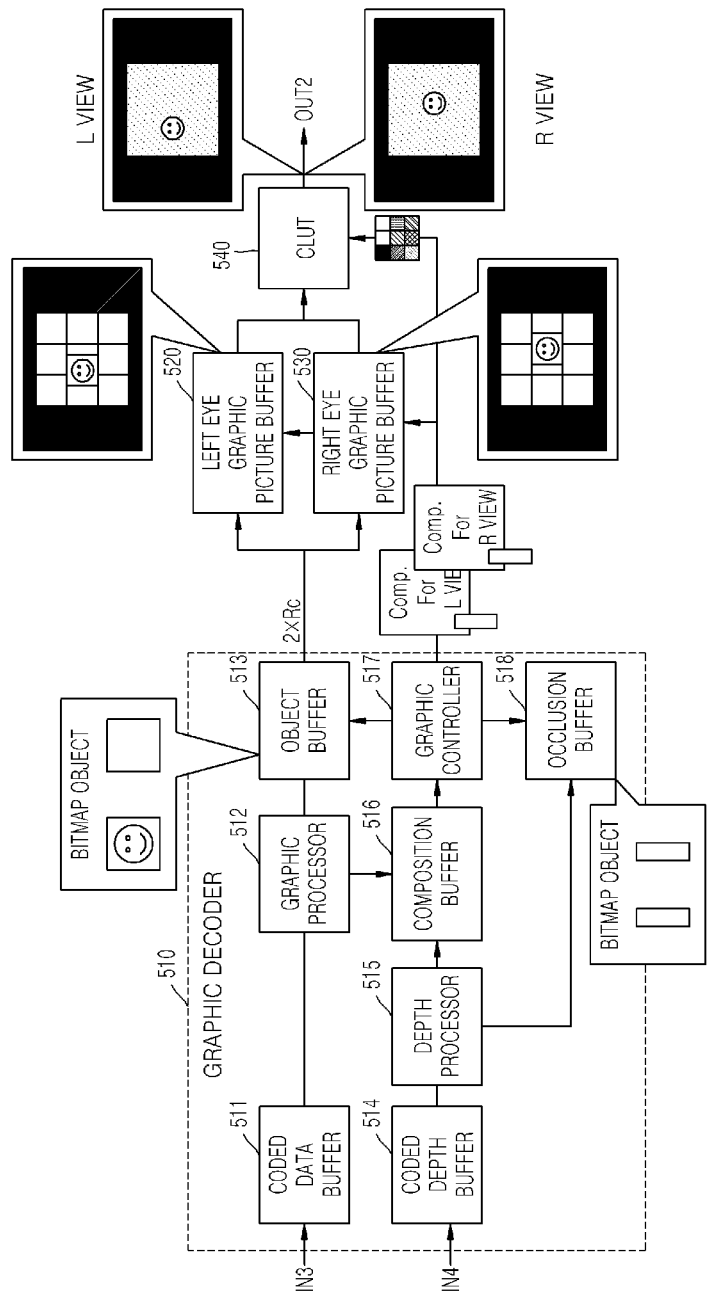
FIG. 5 is a diagram illustrating another example of an apparatus for processing a graphic stream.

FIG. 5 illustrates another example of an apparatus for processing a graphic stream.

Referring to FIG. 5, the apparatus includes a graphic decoder 510, a left eye graphic picture buffer 520, a right eye graphic picture buffer 530, and a CLUT 540. The graphic decoder 510 includes a coded data buffer 511, a graphic processor 512, an object buffer 513, a coded depth buffer 514, a depth processor 515, a composition buffer 516, a graphic controller 517, and an occlusion buffer 518.

The apparatus of FIG. 5 is the same as the apparatus of FIG. 4, except that graphic decoder 510 further includes the occlusion buffer 518. Because other elements of the apparatus of FIG. 5 perform the same functions as those of the apparatus of FIG. 4, further descriptions thereof may be omitted for conciseness.

Referring to FIG. 5, a player setting register of the apparatus may include information indicating whether the apparatus is capable of reproducing a graphic stream in 3D and/or 3D capability information indicating how the graphic stream is reproduced in 3D. The apparatus may determine whether the graphic stream is reproducible in 3D by applying the same depth value throughout a graphic picture or by assigning different depth values according to a plurality of graphic objects included in the graphic picture.

If the apparatus determines that the graphic stream is reproducible in 3D by applying different depth values according to the graphic objects, the apparatus may extract object output time information and depth information about the graphic objects from metadata about the graphic stream.

Unlike the apparatus of FIG. 4, the apparatus of FIG. 5 may use metadata including a hole object and hole composition information as hole compensation information.

The graphic processor 512 may generate at least one graphic object, 2D composition information, and color information by decoding the graphic stream that is recorded in the coded data buffer 511. The graphic processor 512 may transmit the 2D composition information and the color information to the composition buffer 516, and transmit the graphic object to the object buffer 513.

The depth processor 515 may extract and interpret the hole compensation information from the metadata to fill a hole region that is generated as a location of the graphic object changes. As described herein, the hole compensation information of FIG. 5 may include the hole object and a hole region information. The depth processor 515 may transmit the decoded hole object to the occlusion buffer 518.

The depth processor 515 may obtain an object identifier and a depth value/location movement value to be assigned to an identified graphic object by interpreting the metadata. The depth processor 515 may change a location of a graphic object in the 2D composition information decoded by the graphic processor 512 using the depth value/location movement value. The depth processor 515 may generate the left eye composition information and the right eye composition information, which each includes the 2D composition information in which the location value of the graphic object is changed, and hole region identification information.

If a PTS indicates it is time to output the graphic object in 3D, the graphic controller 517, so as to display left and right eye images, may read the graphic object and the hole object respectively from the object buffer 513 and the occlusion buffer 518, and may arrange the graphic object and the hole object by applying left eye composition information and right eye composition information to the graphic object and the hole object. The graphic controller 517 may output the graphic object and the hole object by applying a color that is assigned through the CLUT 540.

Figure 6:
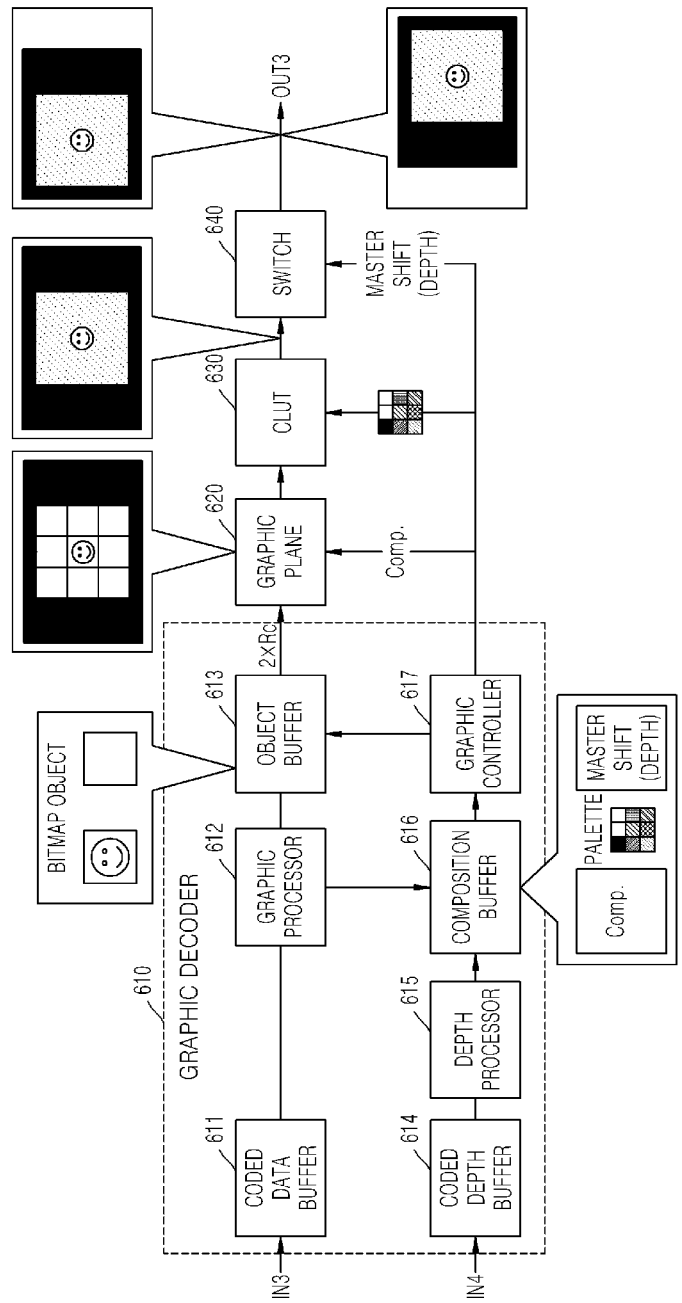
FIG. 6 is a diagram illustrating another example of an apparatus for processing a graphic stream.

FIG. 6 illustrates another example of an apparatus for processing a graphic stream.

Referring to FIG. 6, the apparatus includes a graphic decoder 610, a graphic picture buffer 620, a CLUT 630, and a switch 640. The graphic decoder 610 includes a coded data buffer 611, a graphic processor 612, an object buffer 613, a coded depth buffer 614, a depth processor 615, a composition buffer 616, and a graphic controller 617.

A player setting register of the apparatus of FIG. 6 may include information indicating whether the apparatus is capable of reproducing a graphic stream in 3D and/or 3D capability information indicating how the graphic stream is reproduced in 3D. The apparatus may determine whether the graphic stream is reproducible in 3D by assigning the same depth value throughout a graphic picture or by assigning different depth values according to a plurality of graphic objects included in the graphic picture, using the 3D capability information.

In this example, the apparatus of FIG. 6 includes only one graphic picture buffer 620. The 3D capability information stored in the player setting register of the apparatus may include a flag indicating that the apparatus is capable of reproducing the graphic stream in 3D by applying the same depth value throughout the graphic picture.

Unlike the apparatus of FIG. 4 or 5, the apparatus of FIG. 6 reproduces the graphic stream in 3D by extracting depth information about a graphic picture from metadata, instead of extracting depth information about graphic objects from metadata. As described herein, the depth information about the graphic picture may be information for assigning the same depth value throughout a screen to which graphic objects are output. In this example, the metadata may include both the depth information about the graphic objects and the depth information about the graphic picture. However, because there is only one graphic picture buffer in the apparatus of FIG. 6, the apparatus of FIG. 6 may not be able to generate and store each of a left eye graphic picture and a right eye graphic picture in the graphic picture buffer, like the apparatus of FIG. 4 or 5. Instead, the apparatus of FIG. 6 may extract the depth information about the graphic picture from the metadata, may obtain a location movement value corresponding to a depth value to be applied to the graphic picture, and may scatter the graphic picture alternately at locations that are spaced apart from one graphic plane to the left and right according to the location movement value so that the graphic picture is reproduced in 3D.

The graphic processor 612 may generate a graphic object, 2D composition information, and color information by decoding the graphic stream recorded in the coded data buffer 611. The graphic processor 612 may transmit the 2D composition information and the color information to the composition buffer 616, and transmit the graphic object to the object buffer 613.

Because the apparatus of FIG. 6 includes only one graphic picture buffer 620, the depth processor 615 may extract the depth information about the graphic picture, instead of the depth information about the graphic objects, and may transmit the extracted depth information to the composition buffer 616. The depth information about the graphic picture is indicated as "Master Shift (Depth)" in FIG. 6. The depth processor 615 may obtain a moving distance to move the graphic picture to the left and/or right so as to reproduce the graphic picture in 3D, using the depth value of the graphic picture or the location movement value of the graphic picture that are included in the depth information about the graphic picture.

The depth processor 615 may generate 2D composition information and 3D composition information including the depth information about the graphic picture and the color information, and may store the 2D composition information and the 3D composition information in the composition buffer 616.

If a PTS indicates that it is time to output the graphic object in 3D, the graphic controller 617 may read the graphic object from the object buffer 613, arrange the graphic object in the graphic picture buffer 620 by applying composition information to the graphic object, and apply a color assigned through the CLUT 540 to the graphic object.

The graphic controller 617 may transmit a graphic picture moving value that is obtained by using the depth information about the graphic picture to the switch 640. The switch 640 may alternately scatter the graphic picture at locations moved to left and right on the screen by the graphic picture moving value so as to alternately output a left eye graphic picture and a right eye graphic picture.

For example, a viewer may perceive that images are nonstop sequentially reproduced when a display device displays the images at a frame rate of at least 60 Hz based on one eye. Because a 3D image is generated by combining images received through left and right eyes, the display device may output images at a frame rate of at least 120 Hz for the viewer to perceive that the 3D image are being continuously reproduced. Accordingly, the switch 640 may output the left eye graphic picture and the right eye graphic picture at units of $\frac{1}{120}$ of a second so that the graphic picture is reproduced in 3D.

FIGS. 7A through 7C illustrate examples of composition information generated when graphic picture generating standard information included in metadata is used.

In the description herein, a graphic stream is assumed to be manufactured based on a video image in which left eye and right eye graphic pictures are generated by a depth value or a location movement value. However, metadata about a graphic picture may be generated based only on a left eye (or right eye) video image, i.e., metadata about a left eye graphic picture may be generated.

In FIGS. 7A through 7C, graphic picture generating standard information indicating whether a graphic stream is a left eye graphic stream generated for a left eye video image or a right eye graphic stream generated for a right eye video image, or is prepared based on a 2D video image, is further included in metadata, and composition information is generated based on the graphic picture generating standard information included in the metadata.

In FIG. 7A, a graphic stream is prepared based on a center of a 2D video image. Like the depth processor 415 of FIG. 4, a depth processor may generate left eye composition information and right eye composition information by applying a location movement value or depth value according to graphic objects, and may store the left eye composition information and the right eye composition information in a composition buffer.

In FIG. 7B, a graphic stream is prepared based on a left eye video image. In this example, because 2D composition information about graphic objects included in the graphic stream is the same as left eye composition information, a depth processor only generates right eye composition information. The depth processor may generate the right eye composition information by applying a depth value/location movement value according to graphic objects, and store the generated right eye composition information in a composition buffer with left eye composition information decoded by a graphic processor.

In FIG. 7C, a graphic stream is prepared based on a right eye video image. In this example, because 2D composition information about graphic objects included in the graphic stream are the same as right eye composition information, a depth processor only generates left eye composition information. The depth processor may generate the left eye composition information by applying a depth value/location movement value according to graphic objects, and store the generated left eye composition information in a composition buffer with right eye composition information decoded by a graphic processor.

Figure 8:
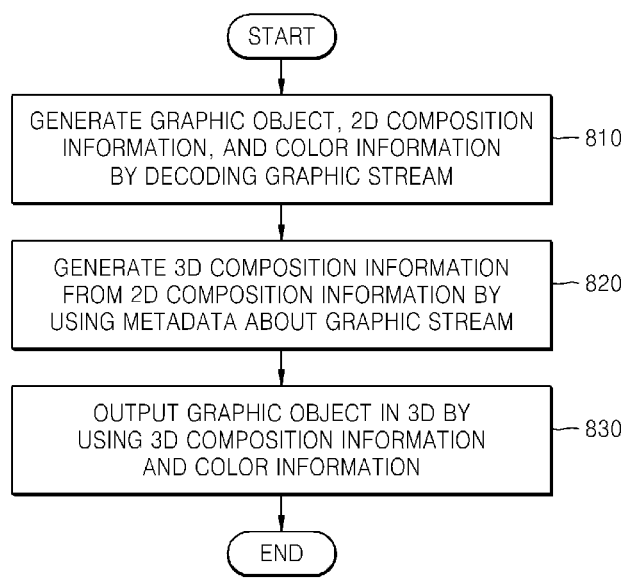
FIG. 8 is a flowchart illustrating an example of a method of processing a graphic stream.

FIG. 8 illustrates an example of a method of processing a graphic stream.

Referring to FIG. 8, an apparatus for processing a graphic stream generates a graphic object, 2D composition information, and color information by decoding a graphic stream, in 810.

The apparatus generates 3D composition information from 2D composition information using metadata about the graphic stream, in 820. Accordingly, the apparatus may obtain a location movement value of the graphic object using the metadata, and generate left eye composition information and right eye composition information including a location value obtained by changing an object location value included in the 2D composition information to the left and right by a predetermined distance using the location movement value. Also, the apparatus may generate 3D composition information by inserting hole compensation information included in the metadata into each of the left eye composition information and the right eye composition information.

The apparatus outputs the graphic object in 3D using the 3D composition information and the color information, in 830.

Figure 9:
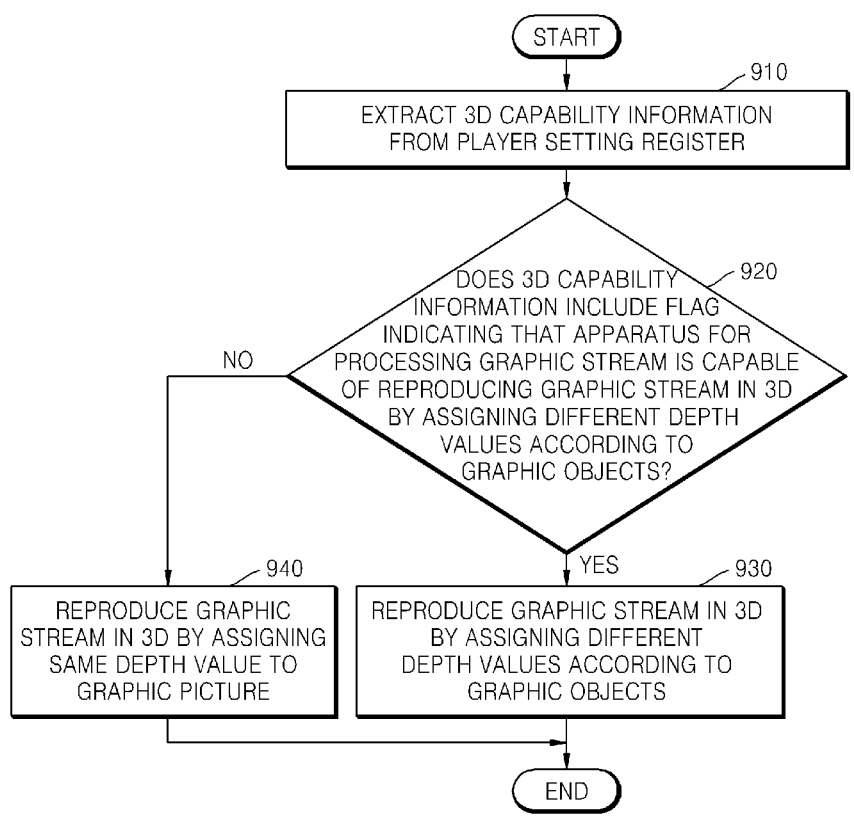
FIG. 9 is a flowchart illustrating another example of a method of processing a graphic stream.

FIG. 9 illustrates another example of a method of processing a graphic stream.

Referring to FIG. 9, an apparatus for processing a graphic stream extracts 3D capability information from a player setting register, in 910. The 3D capability information may indicate how the apparatus reproduces the graphic stream in 3D. The 3D capability information may include one of a flag indicating that the apparatus is capable of reproducing the graphic stream in 3D by assigning different depth values according to graphic objects, and a flag indicating that the apparatus is capable of reproducing the graphic stream in 3D by assigning the same depth value throughout a graphic picture.

The apparatus determines whether the 3D capability information includes the flag indicating that the apparatus is capable of reproducing the graphic stream in 3D by assigning different depth values according to the graphic objects, in 920.

If it is determined that the 3D capability information includes the flag indicating that the apparatus is capable of reproducing the graphic stream in 3D by assigning different depth values according to the graphic objects, the apparatus extracts depth information from metadata, in 930. Also, the apparatus generates a left eye graphic picture and a right eye graphic picture, which assign the different depth values according to the graphic objects, using an object identifier, a depth value or location movement value, and hole compensation information that is included in the depth information, and alternately outputs the left eye graphic picture and the right eye graphic picture to reproduce the graphic stream in 3D, in 930.

If it is determined that the 3D capability information does not include the flag indicating that the apparatus is capable of reproducing the graphic stream in 3D by assigning different depth values according to the graphic objects in 920, i.e., when the 3D capability information includes a flag indicating that the apparatus is capable of reproducing the graphic stream in 3D by assigning the same depth value throughout the graphic picture, the apparatus extracts depth information about the graphic picture from the metadata, and reproduces the graphic stream in 3D by assigning the same depth value to the graphic picture using the extracted depth information, in 940.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing a graphic stream, the method comprising:
   generating graphic objects by decoding the graphic stream;
   generating composition information and color information by decoding the graphic stream;
   generating a graphic picture in which the graphic objects are included using the composition information and the color information;
   extracting three-dimensional (3D) capability information stored in a player setting register of a reproducing apparatus, the 3D capability information comprising a first flag representing a first capability value with respect to a presentation graphic stream and a second flag representing a second capability value with respect to an interactive graphic stream; and
   generating a left eye graphic picture and a right eye graphic picture using the 3D capability information and the graphic picture,
   wherein, in response to the first flag comprising a first value, graphic objects in the left eye graphic picture and the right eye graphic picture in the presentation graphic stream are assigned a same depth in 3D, and, in response to the first flag comprising a second value, the graphic objects in the left eye graphic picture and the right eye graphic picture in the presentation graphic stream are assigned different depths in 3D, respectively, and
   in response to the second flag comprising the first value, graphic objects in the left eye graphic picture and the right eye graphic picture in the interactive graphic stream are assigned a same depth in 3D, and, in response to the second flag comprising the second value, the graphic objects in the left eye graphic picture and the right eye graphic picture in the interactive graphic stream are assigned different depths in 3D, respectively.

2. An apparatus for processing a graphic stream, the apparatus comprising:
   a graphic processor configured to generate graphic objects, composition information, and color information by decoding a graphic stream, and to generate a graphic picture in which the graphic objects are included using the composition information and the color information;
   a depth processor configured to extract three-dimensional (3D) capability information stored in a player setting register of a reproducing apparatus, the 3D capability information comprising a first flag representing a first capability value with respect to a presentation graphic stream and a second flag representing a second capability value with respect to an interactive graphic stream; and
   a graphic picture output unit configured to generate a left eye graphic picture and a right eye graphic picture using the 3D capability information and the graphic picture,
   wherein, in response to the first flag comprising a first value, graphic objects in the left eye graphic picture and the right eye graphic picture in the presentation graphic stream are assigned a same depth in 3D, and, in response to the first flag comprising a second value, the graphic objects in the left eye graphic picture and the right eye graphic picture in the presentation graphic stream are assigned different depths in 3D, respectively, and
   in response to the second flag comprising the first value, graphic objects in the left eye graphic picture and the right eye graphic picture in the interactive graphic stream are assigned a same depth in 3D, and, in response to the second flag comprising the second value, the graphic objects in the left eye graphic picture and the right eye graphic picture in the interactive graphic stream are assigned different depths in 3D, respectively.

3. A non-transitory computer-readable storage medium having stored therein program instructions to cause a processor to implement a method of processing a graphic stream, the method comprising:
   generating graphic objects by decoding a graphic stream;
   generating composition information and color information by decoding the graphic stream;

generating a graphic picture in which the graphic objects are included using the composition information and the color information;

extracting three-dimensional (3D) capability information stored in a player setting register stored in a reproducing apparatus, the 3D capability information comprising a first flag representing a first capability value with respect to a presentation graphic stream and a second flag representing a second capability value with respect to an interactive graphic stream; and generating a left eye graphic picture and a right eye graphic picture using the 3D capability information and the graphic picture, wherein, in response to the first flag comprising a first value, graphic objects in the left eye graphic picture and the right eye graphic picture in the presentation graphic stream are assigned a same depth in 3D, and, in response to the first flag comprising a second value, the graphic objects in the left eye graphic picture and the right eye graphic picture in the presentation graphic stream are assigned different depths in 3D, respectively, and in response to the second flag comprising the first value, graphic objects in the left eye graphic picture and the right eye graphic picture in the interactive graphic stream are assigned a same depth in 3D, and, in response to the second flag comprising the second value, the graphic objects in the left eye graphic picture and the right eye graphic picture in the interactive graphic stream are assigned different depths in 3D, respectively.

4. A non-transitory computer-readable storage medium comprising:

a graphic stream; and metadata about the graphic stream for reproducing the graphic stream in a three-dimensional (3D) graphic picture based on 3D capability information stored in a player register of a reproducing apparatus, the 3D capability information comprising a first flag representing a first 3D capability value with respect to a presentation graphic stream and a second flag representing a second 3D capability value with respect to an interactive graphic stream, wherein the metadata comprises depth information about a graphic object and depth information about a graphic picture, and wherein, in response to the first flag comprising a first value, graphic objects in the left eye graphic picture and the right eye graphic picture in the presentation graphic stream are assigned a same depth in 3D, and, in response to the first flag comprising a second value, the graphic objects in the left eye graphic picture and the right eye graphic picture in the presentation graphic stream are each assigned different depths in 3D, respectively, and in response to the second flag comprising the first value, graphic objects in the left eye graphic picture and the right eye graphic picture in the interactive graphic stream are assigned a same depth in 3D, and, in response to the second flag comprising the second value, the graphic objects in the left eye graphic picture and the right eye graphic picture in the interactive graphic stream are assigned different depths in 3D, respectively.

* * * * *